United States Patent
Abhiram et al.

(10) Patent No.: US 10,922,585 B2
(45) Date of Patent: Feb. 16, 2021

(54) DETERMINISTIC LABELED DATA GENERATION AND ARTIFICIAL INTELLIGENCE TRAINING PIPELINE

(71) Applicant: Recogni Inc., Cupertino, CA (US)

(72) Inventors: Shabarivas Abhiram, Mountain View, CA (US); Eugene M. Feinberg, San Jose, CA (US)

(73) Assignee: Recogni Inc., San Jose, CA (US)

( * ) Notice: Subject to any disclaimer, the term of this patent is extended or adjusted under 35 U.S.C. 154(b) by 129 days.

(21) Appl. No.: 16/273,604

(22) Filed: Feb. 12, 2019

(65) Prior Publication Data

US 2019/0286942 A1 Sep. 19, 2019

Related U.S. Application Data

(60) Provisional application No. 62/642,578, filed on Mar. 13, 2018, provisional application No. 62/662,662, filed on Apr. 25, 2018.

(51) Int. Cl.
*G06K 9/62* (2006.01)
*G06N 3/08* (2006.01)
*H04N 5/225* (2006.01)
*G06K 9/00* (2006.01)
*G06N 3/04* (2006.01)

(52) U.S. Cl.
CPC ....... *G06K 9/6257* (2013.01); *G06K 9/00771* (2013.01); *G06K 9/6262* (2013.01); *G06K 9/6272* (2013.01); *G06N 3/0454* (2013.01); *G06N 3/08* (2013.01); *H04N 5/2258* (2013.01)

(58) Field of Classification Search
CPC .. G06K 9/6257; G06K 9/6272; G06K 9/6262; G06K 9/00771; G06N 3/0454; G06N 3/08; H04N 5/2258
USPC .................................................. 382/155–161
See application file for complete search history.

(56) References Cited

U.S. PATENT DOCUMENTS

| | | | |
|---|---|---|---|
| 5,388,206 A | * | 2/1995 | Poulton ................. G06T 15/005 345/505 |
| 2003/0235332 A1 | * | 12/2003 | Moustafa ............. G06K 9/3208 382/157 |
| 2019/0188542 A1 | * | 6/2019 | Wagenmaker ....... G05D 1/0088 |
| 2019/0205667 A1 | | 7/2019 | Avidan et al. |
| 2020/0019642 A1 | | 1/2020 | Dua et al. |
| 2020/0019863 A1 | | 1/2020 | Dua et al. |

OTHER PUBLICATIONS

Gaidon, Adrien, et al. "Virtual worlds as proxy for multi-object tracking analysis." Proceedings of the IEEE conference on computer vision and pattern recognition. (Year: 2016).*
"Components and Props", reactjs.org, Oct. 6, 2017, retrieved from: http://web.archive.org/web/20171006145308/https://reactjs.org/docs/components-and-props.html, 9 pages.

(Continued)

*Primary Examiner* — Andrew M Moyer
(74) *Attorney, Agent, or Firm* — Ascenda Law Group, PC (57) ABSTRACT

Labeled data is deterministically generated for training or validating machine learning models for image analysis. Approaches are described that allow this training data to be generated, for example, in real-time, and in response to the conditions at the location where images are generated by image sensors.

11 Claims, 7 Drawing Sheets

(56) References Cited

OTHER PUBLICATIONS

Alhaija; et al., "Augmented Reality Meets Computer Vision: Efficient Data Generation for Urban Driving Scenes", International Journal of Computer Vision (Mar. 7, 2018), 126(9):961-972.
Gaidon; et al., "Virtual Worlds as Proxy for Multi-Object Tracking Analysis", Cornell University, arXiv.org, arXiv:1605.06457 [cs.CV], May 20, 2016, 10 pages.
International Search Report and Written Opinion dated Apr. 16, 2019, from the ISA/European Patent Office, for International Patent Application No. PCT/US2019/017784 (filed Feb. 13, 2019), 18 pages.
Narayanan; et al., "Virtual worlds using computer vision", Proceedings 1998 IEEE and ATR Workshop on Computer Vision for Virtual Reality Based Human Communications, Jan. 3, 1998, 12 pages.
Qiu; et al., "UnrealCV: Connecting Computer Vision to Unreal Engine", Cornell University, arXiv.org, arXiv:1609.01326 [cs.CV], Sep. 5, 2016, 8 pages.
Waehner, "How to Build and Deploy Scalable Machine Learning in Production with Apache Kafka", Confluent, Sep. 29, 2017, retrieved from: https://www.confluent.io/blog/build-deploy-scalable-machine-learning-production-apache-kafka/, 8 pages.
Hoffman; et al., "Cycada: Cycle-Consistent Adversarial Domain Adaptation", Cornell University, Dec. 29, 2017, arXiv:1711.03213v3 [cs.CV], 15 pages.
International Preliminary Report on Patentability dated Sep. 24, 2020, from The International Bureau of WIPO, for International Patent Application No. PCT/US2019/017784 (filed Feb. 13, 2019), 11 pages.
International Preliminary Report on Patentability dated Sep. 24, 2020, from The International Bureau of WIPO, for International Patent Application No. PCT/US2019/017782 (filed Feb. 13, 2019), 10 pages.
International Search Report and Written Opinion dated May 15, 2019, from the ISA/European Patent Office, for International Patent Application No. PCT/US2019/017782 (filed Feb. 13, 2019), 16 pages.
Isola; et al., "Image-to-Image Translation with Conditional Adversarial Networks", Computer Vision and Pattern Recognition, arXiv:1611.07004v2 [cs.CV] (Nov. 22, 2017), 17 pages.
Non-Final Office Action dated Aug. 21, 2020, for U.S. Appl. No. 16/273,597, filed Feb. 12, 2019, 11 pgs.
Zhu; et al., "Unpaired Image-to-Image Translation using Cycle-Consistent Adversarial Networks", Computer Vision and Pattern Recognition, arXiv:1703.10593v4 [cs.CV] (Feb. 19, 2018), 20 pages.
Zhu; et al., "Unpaired Image-to-Image Translation using Cycle-Consistent Adversarial Networks", Cornell University, Mar. 30, 2017, arXiv:1703.10593v1 [cs.CV], 18 pages.

\* cited by examiner

DETERMINISTIC LABELED DATA GENERATION AND ARTIFICIAL INTELLIGENCE TRAINING PIPELINE

RELATED APPLICATIONS

This is a NONPROVISIONAL of, claims priority to, and incorporates by reference U.S. Provisional Application No. 62/642,578, filed 13 Mar. 2018, and U.S. Provisional Application No. 62/662,662, filed 25 Apr. 2018.

FIELD OF THE INVENTION

The present invention is directed to approaches for training a machine learning model using deterministically generated labeled data.

BACKGROUND

Development of computer vision models can be hindered by a lack of sufficient training data for teaching the model to correctly classify the content of images. For example, computer vision models for classifying images are typically assembled as collections of pre-existing image data that is labeled by humans to indicate the items depicted in the images. However, by this approach, expanding the training data set is difficult because the available images may not be similar to the types of images that must be classified in practice, as well as because the model must learn to determine where the item is in the image using relatively imprecise labels—that is, the labels typically do not indicate exactly what parts of the image contain the labeled item and what parts contain other content. For example, a conventional approach for obtaining labeled image training data is to pay humans hired via Taskrabbit or Mechanical Turk to label images, or to obtain human-labeled images via CAPTCHA-based authentication services. Additionally, conventional, prior approaches do not permit generating targeted training data as needed in response to current conditions at the location where the machine learning model is used to process images.

Accordingly, there is a need for approaches that address these problems, and the present application discloses embodiments that address aspects of this need.

SUMMARY

Embodiments are described for methods, systems, and computer-readable media for training a machine learning model to identify targeted content, wherein the machine learning model is associated with a mounted camera device having a plurality of image sensors. First, a scene specification outline and a seed value are received. The scene specification outline may specify a range of scenes, a scene including one or more objects and a camera model. Next, a plurality of scene specifications may be generated based on the scene specification outline and the seed value, wherein at least some of the plurality of scene specifications represent the targeted content as one or more target objects. Next, an object-labeled training bundle may be generated based on each of the scene specifications. Each object-labeled training bundle may include (1) a label concerning the one or more target objects, and (2) a plurality of images, wherein each image of the plurality corresponds to a particular one of the plurality of image sensors and has image properties and pixel content based on the optical properties and perspective of the particular one of the plurality of image sensors. Next, or as object-labeled training bundles are generated, the bundles may be streamed to one or more training instances comprising a training-instance machine learning model. The training-instance machine learning model may be trained using the object-labeled training bundles, wherein the object-labeled training bundles are not retained after updating the machine learning model based on the bundles. The training-instance machine learning model may then be provided to the mounted camera device.

DETAILED DESCRIPTION

Embodiments of apparatuses, computer systems, computer-readable media, and methods for deploying systems for real-time image processing are described, including approaches for deterministically generating labeled data for training or validating machine learning models. For example, in certain embodiments, the approaches described herein may be used to generate targeted training data in real-time in response to conditions at the locations where the images awaiting inference (i.e., the "sample images" generated by image sensors at camera devices) are produced. Embodiments of the invention may be used to sample images or sample video into semantic meaning. In certain embodiments, audio data may additionally be incorporated into the determination of semantic meaning. For example, various scenarios may be imaged and, using the approaches described herein, the scenarios may be identified and responsive action (e.g., sending a notification containing a semantic description of the scenario) may be taken. For example, video of a possible terrorist leaving a possible explosive device in a train station may be identified and given a semantic description—e.g., a person placing a backpack at a particular location within the view of a camera. In another example, video of a car blocking a driveway may be converted to a semantic description—e.g., a specification of a range of time points associated with a type of vehicle positioned in front of the driveway and a second range of time points associated with a person exiting the vehicle. In another example, a count of water bottles in an image of people at a musical event may be obtained. In another example, events such as a car accident or a landslide may be inferred from a video stream of a roadway, leading to a responsive notification of the events. In another example, a system may prepare a semantic description including a count of customers entering and leaving a store, including how long each customer remained in the store and what each customer handled or gestured toward while inside the store.

In order for a system to convert sample image data into semantic descriptions of the sample image data, the system may first be trained to identify "targeted content"—i.e., the content, circumstances, and events that the system is trained to identify, and that may be represented by such semantic descriptions. As used herein, a "semantic description" is a specification concerning the meaning of the content depicted in the image data or an event involving the depicted content. Accordingly, in certain embodiments, the system is configured to generate image training data that depicts the targeted content or events that should be identifiable by the system. In particular, in certain embodiments, the image training data should depict a range of examples of the targeted content. For example, the examples may include variations in the context of the targeted content, such as depicting the targeted content in different types of weather if the sampled images will be outdoor, depicting the targeted content having various orientations relative to the camera perspective, or depicting the targeted content in connection with prop items. In certain embodiments, certain variations in the context for the training data may be responsive to current or expected conditions at the location of the targeted content—for example, a deployed camera device may provide the average brightness of the scene at the location; this average brightness may then be used to generate a set of image training data based on the average brightness value, which may then be used to train the machine learning model used by the deployed camera device, update the model at the deployed camera device, and accordingly improve identification of the targeted content at the current average brightness for the location. Conditions at the location of the targeted content may include, for example, weather (snow, rain, fog), brightness, physical deformities in or changes to surrounding largely static objects. In cases of indoor settings, changes to the conditions may include, for example, a retail store remodel, the introduction of holiday specific decorations (Halloween, Christmas, and the like), or changes in conditions as a result of physical changes in the mounting location of the camera device.

In certain embodiments, the image training data should depict examples of the targeted content as viewed from the expected perspective and optical characteristics of the device having image sensors used to capture the sample images (wherein the device may be a camera with one or more image sensors). For example, the image training data may depict content as viewed from the mounted height and particular perspective of each image sensor of the device having image sensors. Additionally, the image training data may match the resolution and color profile of particular image sensors. These perspective and optical characteristics are discussed further below.

Figure 1:
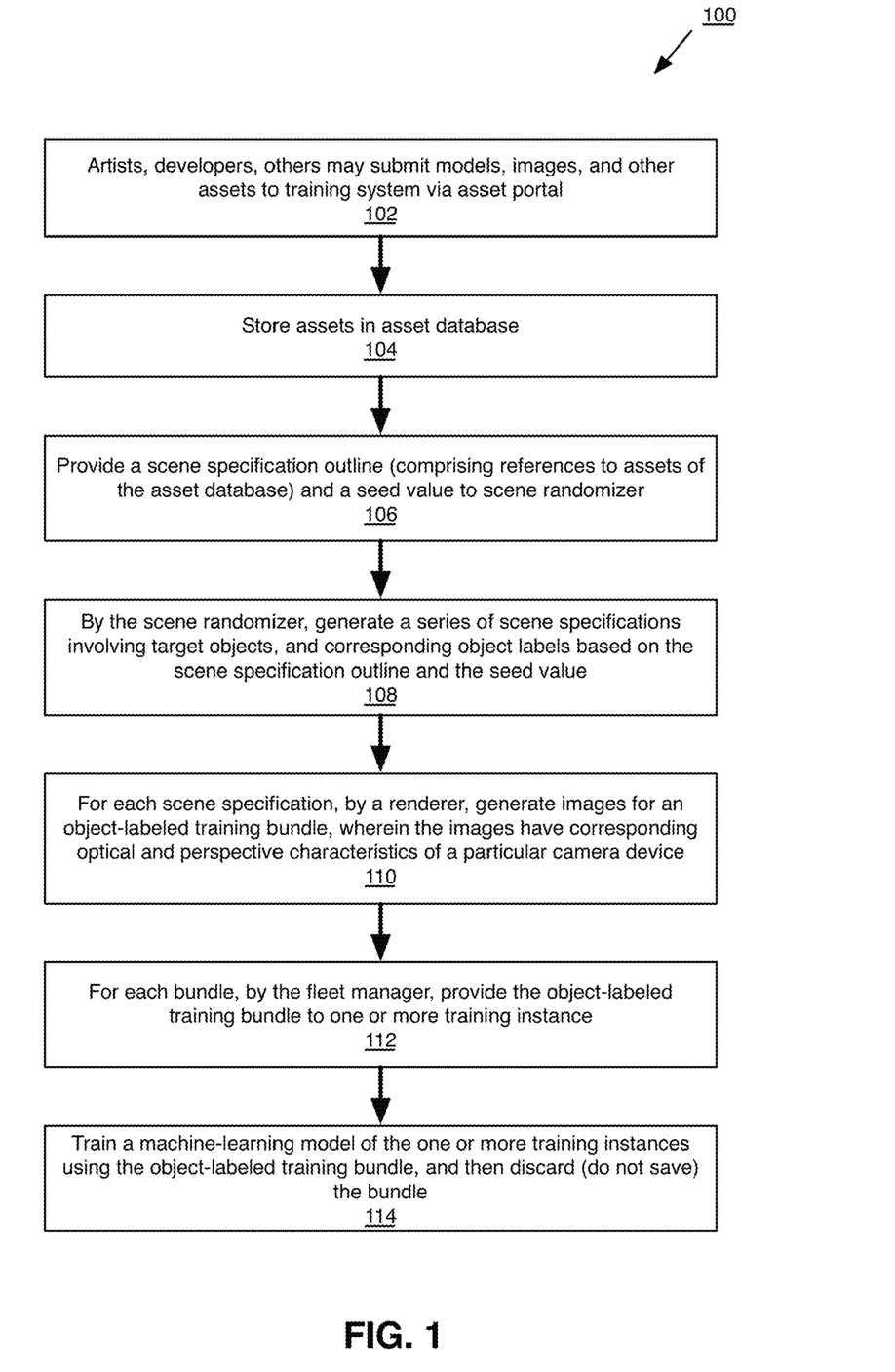
FIG. 1 is a flow chart for an exemplary process concerning a system for training a machine-learning model, in accordance with some embodiments of the invention.
Figure 2:
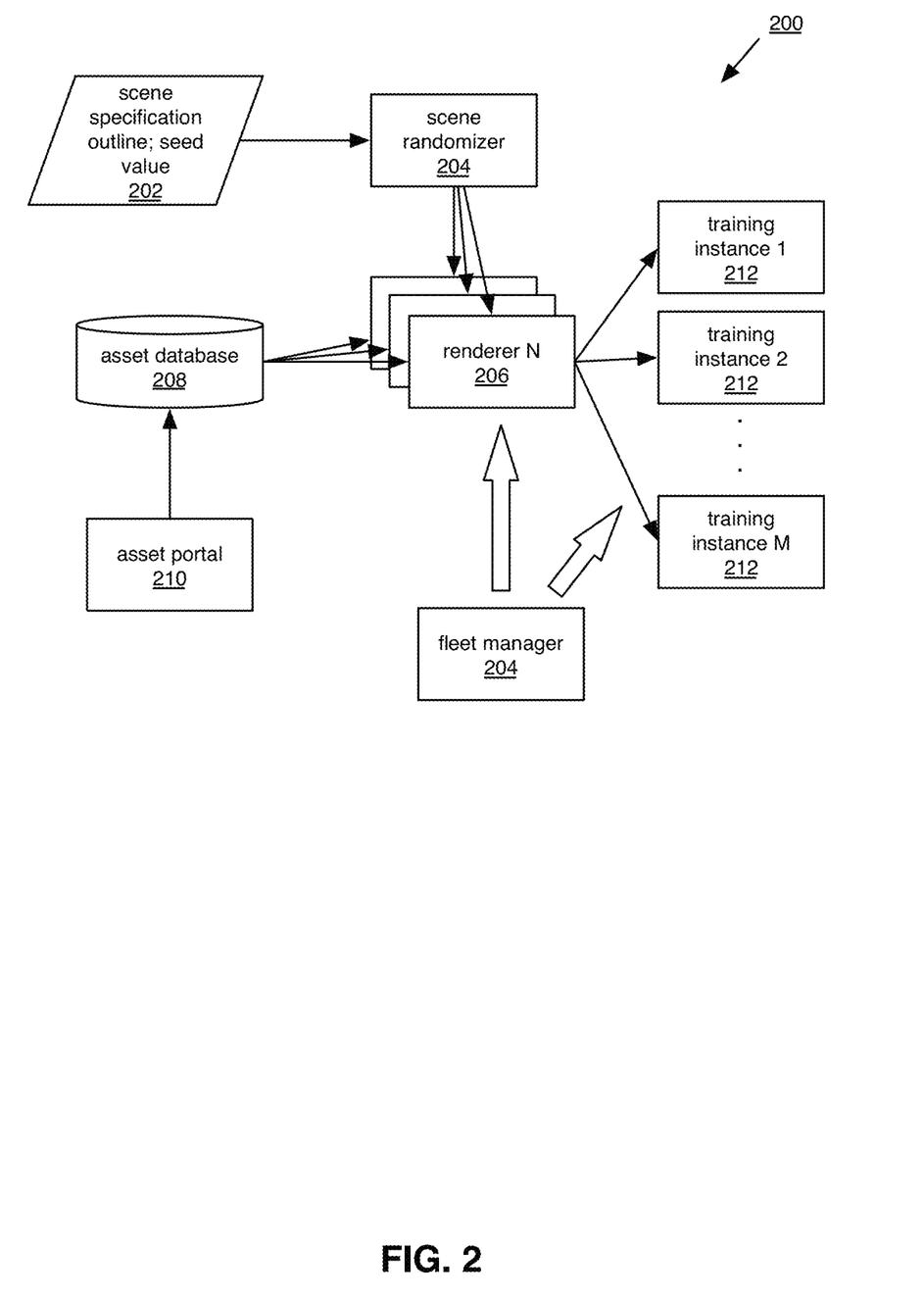
FIG. 2 depicts components of an exemplary machine learning training system, in accordance with some embodiments of the invention.

FIG. 1 is a flow chart for an exemplary process 100 concerning a system for training a machine-learning model (e.g. exemplary machine learning training system 200, as shown in FIG. 2). A machine learning training system may first be populated with assets for use in generating labeled training data. For example, artists, developers, and others may provide asset models, images, and other assets to the training system via an asset portal 210 (102). The assets may be stored in an asset database 208 (104). Asset portal 210 may include a user interface and associated application for receiving and managing the contents of the asset database 208—e.g., the portal 210 may be used to provide documentation about submitted assets, as well as to modify or delete the assets from database 208. Assets include asset models and asset materials used to populate a scene. A scene may be rendered to generate an image; such an image may be used as a component of image training data. A scene comprises renderable objects and associated metadata (e.g., defining location, rotation, relative scale), a specification of the enclosing environment of the objects (e.g., a sky sphere or cube map), and a camera model defined by (but not limited to) properties like X and Y resolution, focal length, aperture, exposure time, various compression and metering settings. Targeted content and prop items may be represented as objects. Asset models and asset materials may be used to represent objects, the object environment (e.g., representations of weather, lighting, the sky sphere or cube map), and any other content shown in rendered image training data. Asset models define the shape of an object and may include, for example, a mesh of triangles defining the three-dimensional shape of an object. Asset materials may include, for example, textures rendered as the surface texture of objects (e.g., provided as images, such as an adhesive label or the metal cap texture for a bottle), and a normal map for refining the surface texture of objects.

A scene specification outline (concerning targeted content) and a seed value may be provided as input 202 to prepare image training data for training a machine learning model to identify the targeted content in image data. The scene specification outline is a set of text commands defining a range of scenes, where certain of the scenes (1) include object(s) representing aspects of the targeted content (leading to positive examples of the targeted content) and certain of the scenes (2) do not include the object(s) representing the targeted content (leading to negative examples). The specified objects may be defined in terms of items in the asset database 208. In certain embodiments, the range of scenes is defined using a set of exemplar scenes. The scene definitions in the scene specification outline may be specified using a terse grammar. In certain embodiments, the range of scenes includes features, such as context-specific constraints, based on a camera device that will use the machine learning model to process sample data, including, for example, the scene topology (e.g., the types of object instances in the environment of the camera device), the mounting location and perspective of sensors of the camera device relative to the scene, and whether the camera device is moving or still.

Example 1

In one example, a portion of an exemplar scene in a scene specification outline may include the following three text commands that define aspects of the scene:

| | |
|---|---|
| set_sun_position 300 120 45 | // Sets the sun position to some heading in space |
| spawn_object_from_group backpacks | // Spawn a backpack with a random texture, mesh |
| load_scene scenes/train_station_01 | // Load an arbitrary scene |

In this example, the backpack object may represent the targeted content (or an aspect of the targeted content, if, e.g., the targeted content is the event of a backpack being discarded by a person at a train station).

Objects may be defined to represent a broad variety of actors and props. For example, human objects may be specified as having a particular gender, age or age range, ethnicity, articles of clothing associated with various colors; objects may additionally represent particular vehicles or accessories. Certain objects may be defined to be composed of other objects or to have complex labels for object components, such as defining the coordinates of human body joints, face positions, orientations, and expressions. For example, in order to train a machine learning model to identify a person wearing a backpack, the model may be trained using training data representing the person alone, the backpack alone, and the person wearing the backpack. Additionally, the granular portions of the training data (e.g., pixels) corresponding to the person and the backpack, respectively, may be specified.

Objects may be defined using a library of environmental structures to serve as props or context, including weather, vegetation (e.g., trees, grasses, shrubs, which may be, e.g., placed as props to aid detection of a target object moving behind the prop object), and buildings. Robust use of prop objects and providing a thoughtful range of environments may aid in generating more realistic locations or environments in order to improve the machine learning model's capacity to identify target objects.

The scene specification outline and the seed value may be provided as input to a scene randomizer 204 (106). The scene randomizer generates an expanded set of scene specifications based on the scene specification outline and the seed value (108). Stated another way, a variety of scenes and associated objects may be procedurally created based on the scene specification outline. The scene randomizer populates the expanded set of scene specifications by generating a set of different versions of the individual text commands, using the seed value (e.g., a number or string) to seed commands for generating semi-random output (e.g., where such commands are drawn from a fuzzing library) that may be used to parameterize the different versions of the individual text commands. The scene randomizer may be context-aware— that is, the scene randomizer may generate versions of the individual text commands in which the range of versions is dependent on aspects of the scene, such that the type of variation generated is appropriate or plausible. The scene context may be maintained by the randomizer, which can allow plugins (e.g., small Python scripts, loaded at runtime) to model various attributes like gravity, other physics, local weather, time-of-day, and the like. The plugins may implement functions that can semi-randomly generate plausible positions, textures, rotations, and scale for various objects in the asset database. Plausible variations for scenes may be modeled using climate engines, physics engines, and the like. For example, if the scene is indoors, the scene randomizer may generate indoor props rather than outdoor props. If the scene is outdoors and a rain scene, the scene randomizer may generate different types of rain and limit lighting to lower light levels appropriate for a rain scene. In certain embodiments, the semi-random output may be, for example, numbers drawn from a certain distribution anchored by the parameters in the scene specification outline commands, such as a normal distribution having a mean set by a parameter from a scene specification outline command. In certain embodiments, the semi-random output will be seeded by the seed value or a derivative seed value based on the seed value, and will accordingly generate the same output each time the same seed value is used. Stated another way, in certain embodiments, the seed value is used to deterministically produce the same text when operated on by a fuzzing library. If the seed is changed, new varieties of the same type of labeled data will be generated.

The series of scene specifications generated by the scene randomizer may be provided to one or more renderers 206 in order to generate a set of images corresponding to each scene specification (110). The rendered images may be based on the perspective and optical characteristics of each particular image sensor of the camera device that will be used to generate the sample images, as specified in the scene specifications. Each set of images collectively represents a single "snapshot" of the scene from the perspective of each image sensor, and accordingly each image of the set of images is associated with the same hypothetical time point in the scene. In certain embodiments, each image of the set is generated according to a separate scene specification. The optical characteristics may include, for example, the sensor's resolution, color detection profile, the sensor's position relative to the other sensors of the camera device, lens properties such as a wide angle lens versus a regular lens, type of light information (infrared, visible, etc.), focal length, aperture, and the like. For example, if the camera device generates four 4k images using its four image sensors, the set of images generated by the renderer may be four 4k images. Additionally, the renderer may additionally use the assets from the asset database as specified in the scene specifications to render the set of images. In certain embodiments, the series of scene specifications may be apportioned to multiple renderers (e.g., a number N renderers 206), such that rendering of the images may be executed in parallel. Each set of rendered images based on a single scene specification may be packaged into an object-labeled training bundle. The object-labeled training bundle includes the set of rendered images and a label indicating the existence or lack thereof of an object in the rendered scene, the object corresponding to targeted content. The object-labeled training bundle may additionally specify the pixels in the set of rendered images that represent the object corresponding to targeted content, and/or other metadata, such as a description of lighting conditions, the existence or location of prop items in the images, a time point if the object-labeled training bundle is a member of a time series, and the like. In certain embodiments, a scene specification outline may be used to define a series of moving objects that represent targeted content that represents an event, and such an event may be represented in the image training data as a time series of object-labeled training bundles.

In certain embodiments, the render 206 uses a gaming engine, such as the Unreal engine, Unity, GoDot, Cry engine to render the scene specifications.

A fleet manager 204 may then stream the object-labeled training bundles as they are generated to one or more training instances 212 (112). In certain embodiments, there may be multiple training instances (e.g., a number M training instances). Each training instance 212 may be, for example, a server, a virtual machine, or a cloud service container hosting a machine learning model to be trained, such as a convolutional neural network model including the associated weights. In certain embodiments, prior to training the machine learning model with a set of received object-labeled training bundles, the training instance 212 may initialize a new machine learning model, or the training instance may load a checkpoint from a previously trained model (e.g., a checkpoint may contain or identify a set of weights and biases learned by a neural network having the same structure as the neural network to be trained by the training instance). In certain embodiments, the fleet manager 204 may collect the object-labeled training bundles and dispatch them to a single training instance when a set number of bundles is collected.

The training instance may train or update the machine learning model using each of the received object-labeled training bundles, such that the machine learning model is optimized to associate each bundle image set with its appropriate label (114). In certain embodiments, the object-labeled training bundle is not retained after training by any component of machine learning training system 200, as the bundles can be re-generated as needed using the tersely defined scene specification outline and the seed value. This provides the advantage of permitting the use of large or high-resolution images for training the machine learning model, as there is no need to allocate a large storage space to maintain the training data in the case that the training data needs to be adjusted or revisited in order to retrain a machine learning model or determine why a particular machine learning model generated unexpected results when trained with the training data.

Figure 3:
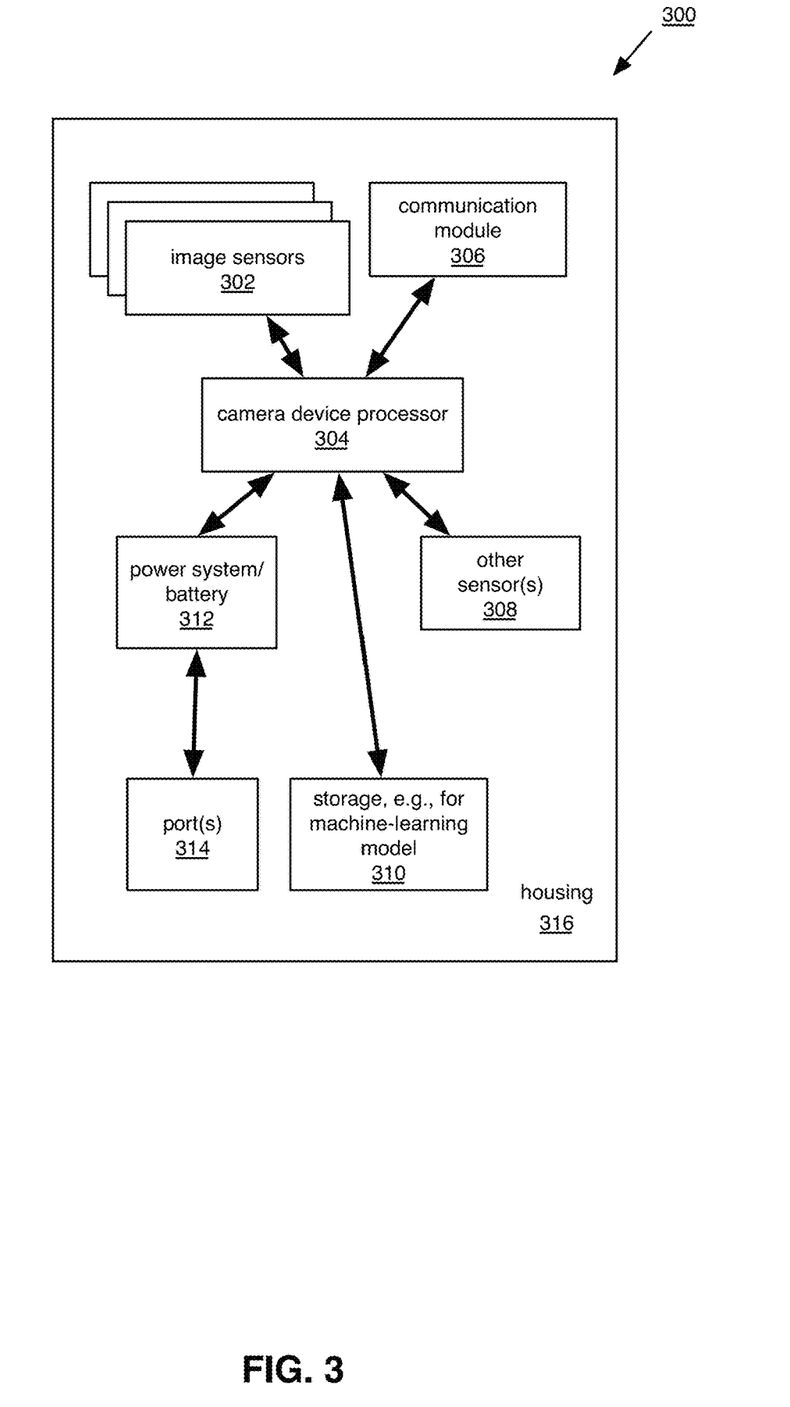
FIG. 3 depicts exemplary components of an image-generating camera device, in accordance with some embodiments of the invention.

FIG. 3 depicts exemplary components of an image-generating camera device 300. Camera device 300 includes two or more image sensors 302 for imaging the environment of device 300. For example, the image sensors 302 may be arranged in the device 300 with a certain spacing between respective sensors in order to enable inference of the depth of objects from device 300 in the environment of device 300. In certain embodiments, corresponding information from image sensors 302 positioned across multiple physical devices may be collected, for example in order to facilitate depth inference. Image sensors 302 may detect grayscale (single channel) light information, color (e.g., RGB, HSV/HSB, HSL, or YUV, to generate three or more color channels), or infrared light information. Image sensors 302 may be capable of providing 4K resolution images (i.e., generating images having at least 4,000 pixels along one dimension), or 10K resolution, or greater. In certain embodiments, camera device 300 may be mounted at a fixed position at a fixed height above the ground. In certain embodiments, camera device may be mounted on a moving object, such as a person, a vehicle, or a drone.

Camera device 300 may include one or more camera device processors 304. In certain embodiments, any of processors 304 may be a special-purpose processor for computing neural network inference calculations. In certain embodiments, processor 304 is a general-purpose processor. Processor 304 may be in communication with image sensors 302, a communication module 306, other sensors 308, a storage component 310, and a power system and/or battery 312. The power system/battery 312 may be in communication with one or more port(s) 314.

Camera device 300 may include one or more other sensors 308, such as a temperature sensor for monitoring thermal load or ambient temperature, an accelerometer, microphone, or the like. Communication module 306 may include a cellular radio, Bluetooth radio, ZigBee radio, Near Field Communication (NFC) radio, wireless local area network (WLAN) radio, a subscriber identity module (SIM) card, GPS receiver, and antennas used by each for communicating data over various networks such as a telecommunications network or wireless local area network. Storage 310 may include one or more types of computer readable medium, such as RAM, optical storage devices, or flash memory, and may store an operating system, applications, communication procedures, and a machine-learning model for inference based on the data generated by image sensors 302 (e.g., a local machine-learning model). The power system/battery 312 may include a power management system, one or more power sources such as a battery and recharging system, AC, DC, a power status indicator, and the like. In certain embodiments, the components of camera device 300 may be enclosed in a single housing 316.

Figure 4:
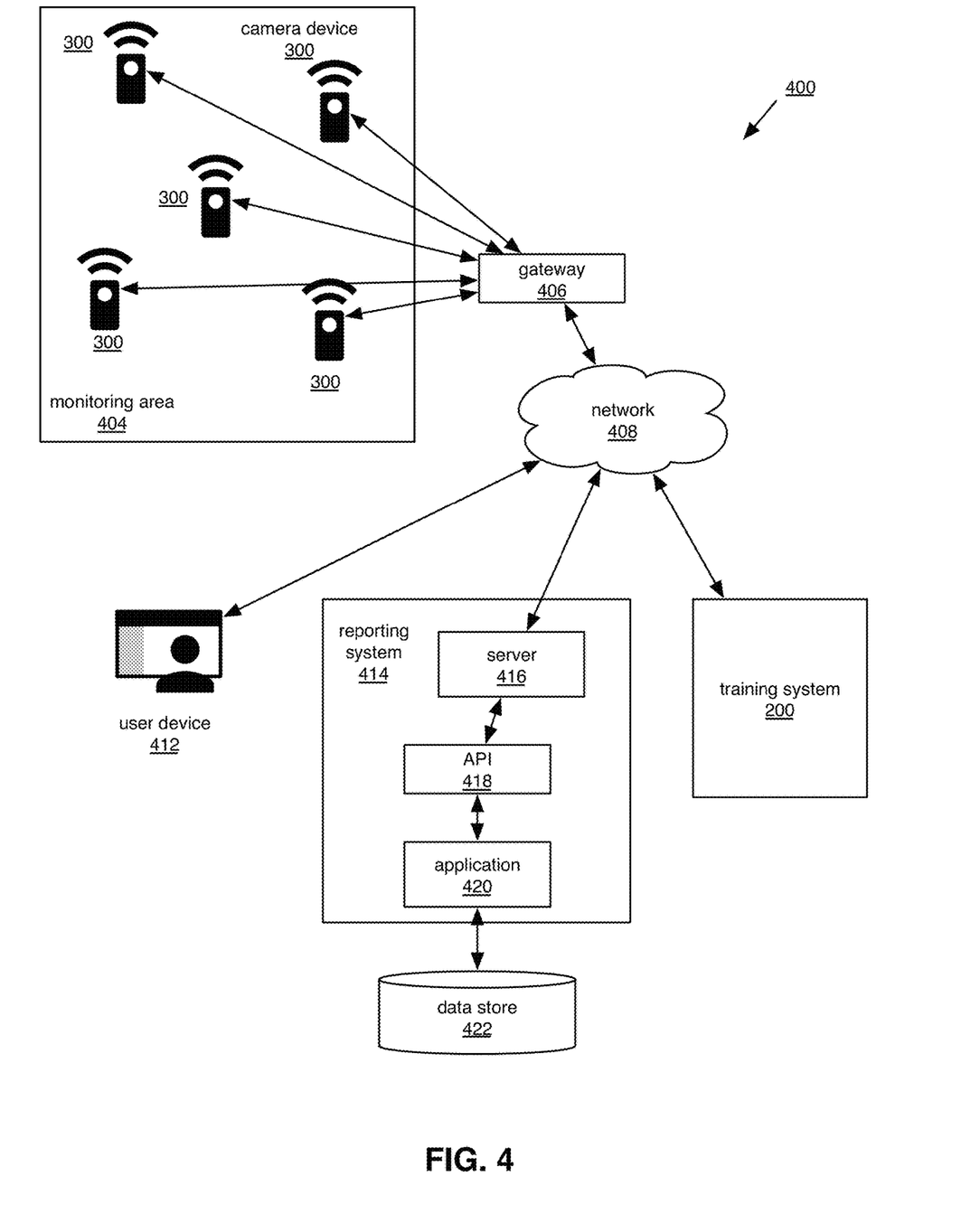
FIG. 4 depicts components of an exemplary distributed system for real-time image processing, in accordance with some embodiments of the invention.

FIG. 4 depicts exemplary data flows and components of an exemplary distributed system for real-time image processing 400. In certain embodiments, a collection of camera devices 300 are placed within a monitoring area 404 (e.g., the potential location of targeted content or the environment of camera device 300). Camera devices 300 may provide notifications or the output of inferences to gateway device 406 via wired or wireless communication channels, and may receive updates to their local machine-learning models via those channels. Network 408 represents a telecommunications network, a wired or wireless local area network, or the internet. In certain embodiments, camera devices 300 may connect to network 408 without gateway device 406. In certain embodiments, reporting system 414 runs on a cloud service or one or more computing devices hosting a server 416, such as an HTTP server, and an application 420 that may initiate certain actions (e.g., sending reports to client devices) based on events detected or based on inferences at camera devices 300. For example, defined actions and/or user account information may be stored in data store 422. Application 420 may support an Application Programming Interface (API) 418 providing external access to methods for accessing data store 422. In certain embodiments, client applications running on user device 412 or other client devices may access API 418 via server 416 using protocols such as HTTP or FTP, in order to, e.g., view training system user interfaces or reporting system user interfaces and the like. Training system 200 may be in communication with camera devices 300 directly or indirectly via network 408.

Figure 5:
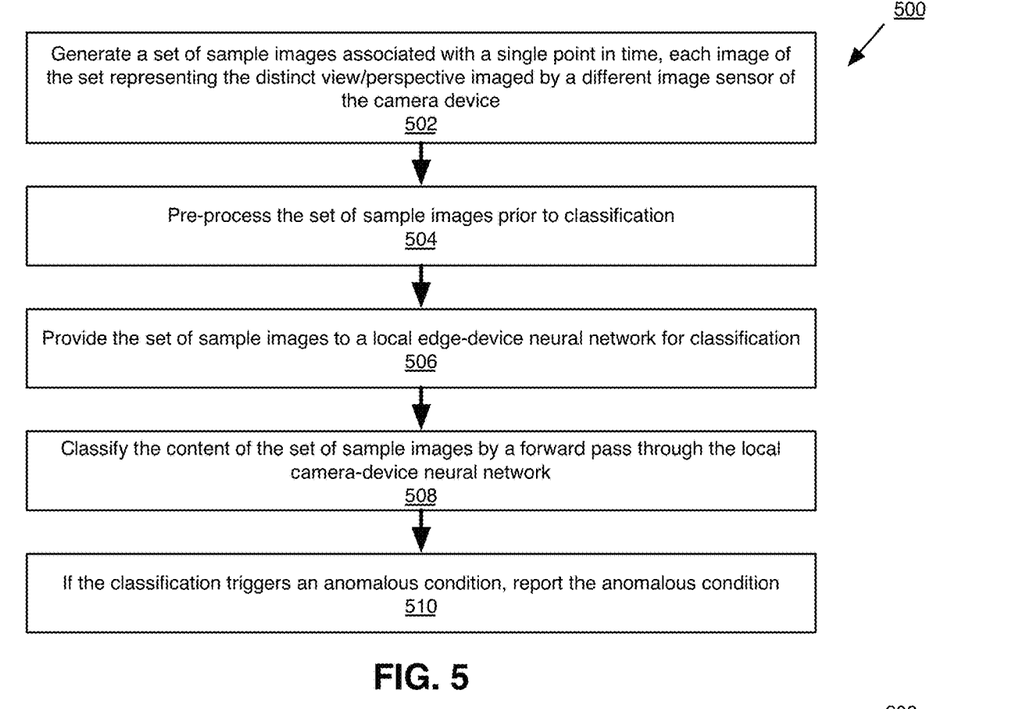
FIG. 5 is a flow chart for an exemplary process concerning inference for the content of images using a neural network, in accordance with some embodiments of the invention.

FIG. 5 is a flow chart for an exemplary process 500 concerning inference for the content of images using a neural network. First, a set of sample images is generated by image sensors 302 of a camera device, such as camera device 300 (502). For example, if the camera device uses four image sensors, the set of sample images will contain four images. The sample images may depict, for example, the content of a monitoring area 404 from the perspective of each image sensor 302. In certain embodiments, the set of sample images are simultaneously obtained, representing an imaged, real-world scene at a single time point. In certain embodiments, the set of sample images is pre-processed to facilitate inference of the content of the images (504). For example, the set of sample images may be, for example, filtered to remove noise, cropped to a smaller size, or reduced in resolution. In certain embodiments, this pre-processing is executed by the camera device. The set of sample images may then be provided to a local camera-device neural network model—that is, the neural network model may be stored and used by the camera device (506). The camera device may classify the content of the set of sample images using the local camera-device neural network model (508). For example, the neural network model used by the camera device 300 may have been trained to recognize vehicles (i.e., the targeted content) within a scene based on the location and perspective of a particular camera device 300 in monitoring area 404. Processing the set of sample images by a single forward pass through the local camera-device neural network model may generate a description regarding the presence of the targeted content in the set of sample images—e.g., the output may be a count of each of several types of vehicles depicted within view of the camera device (508). In certain embodiments, the description regarding the presence of the targeted content may include the positions of instances of the targeted content within the images (where instances are each identified item of targeted content, e.g., identified individual vehicles), or an assignment of categories of targeted content (e.g., the types of each identified vehicle, such as car or truck). In certain embodiments, the camera device 300 or a device in communication with camera device 300 may further analyze the classification of one or more sets of sample images to identify a reportable circumstance, such as an anomalous condition (510). For example, the camera device 300 may be configured to send an alert if the description regarding the presence of the targeted content satisfies a reportable circumstance that is an alarm condition. For example, if the monitoring area 404 is a parking lot, and the description regarding the presence of the targeted content indicates a count of vehicles (the targeted object) greater than a threshold of 50, this may indicate that the parking lot is full (the alarm condition). In response to meeting the alarm condition, the camera device 300 may generate and send an alert to a component of system 400, e.g., gateway 406 or reporting system 414 to inform the component about the alarm condition. In certain embodiments, the reportable circumstance may be triggered based on the local camera-device neural network model's failure to classify the content of the sample images. For example, the neural network model may generate a low probability value for each possible target content category, indicating that the content is unlikely to be classified properly. The camera device 300 may report the circumstance, including in the report one or more images from the set of sample images, or a video clip related to the set of sample images, or the like. In certain embodiments, a report may be automatically generated by each camera device 300 at the end of time intervals (e.g. one hour or one day) to summarize the detected targeted content by each camera device 300 during the time interval.

Figure 6:
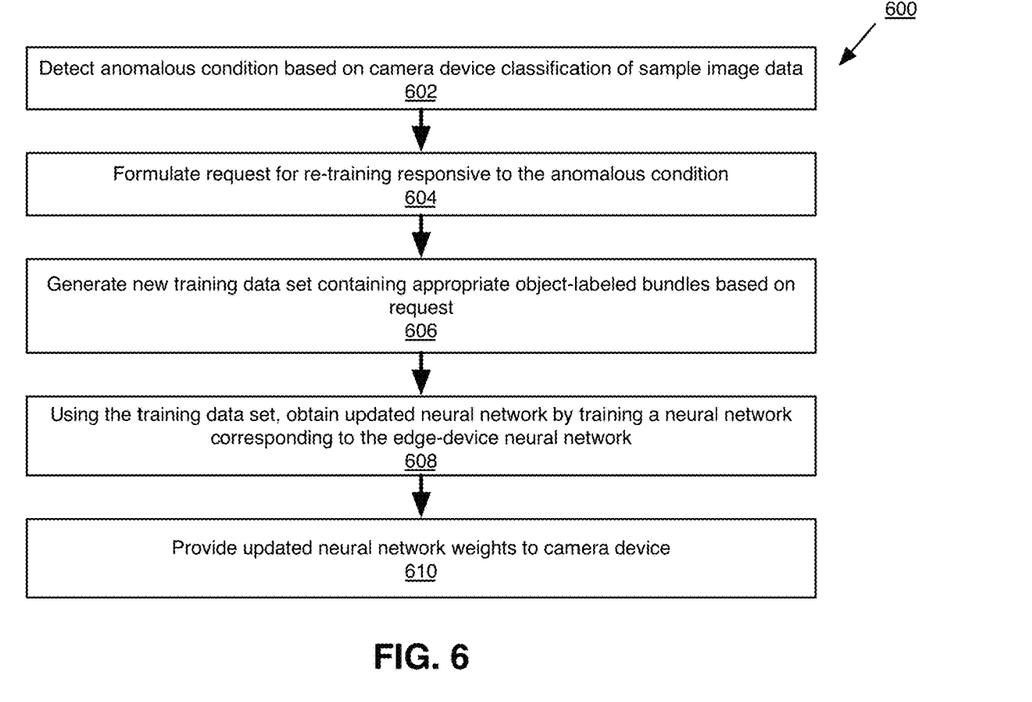
FIG. 6 is a flow chart for an exemplary process concerning retraining a neural network model in response to detection of an event such as an anomalous condition, in accordance with some embodiments of the invention.

FIG. 6 is a flow chart for an exemplary process 600 concerning re-training a neural network model in response to detection of an event or a condition such as an anomalous condition. First, an anomalous condition may be detected based on a classification of sample image data, e.g., by a camera device 300 as in process 500 (602). Camera device 300 (or another component of system 400) may formulate a request for re-training based on the anomalous condition (604)—for example, the local camera-device neural network may be trained to detect targeted content under a first circumstance that meets a first condition (e.g., a first circumstance in which the average lighting of the scene falls within a first range). For example, the local camera-device neural network may have been trained using an original set of object-labeled training bundles that were generated to satisfy the first condition. If camera device 300 determines, e.g., based on sample image data, that the average lighting of the monitoring area 404 no longer falls within the first range and thus no longer satisfies the first condition, a request may be formulated for re-training in accordance with a second condition (e.g., a second range for average lighting that encompasses the current average lighting value). The request may further identify the neural network model being used as the local camera-device model. A second, new training data set may be generated based on the request (606). For example, training system 200 may receive the request and may generate the second training data set of object-labeled training bundles by automatically replacing the representation of the first condition in the scene specification outline used to generate the first set of object-labeled training bundles with the second condition. Accordingly, using such a modified scene specification outline to generate object-labeled training bundles as described in connection with steps of process 100, a second set of object-labeled training bundles may be generated in which only the lighting information has changed relative to the first set, in order to better suit the current condition (i.e., the second condition). An updated neural network model may be obtained by training the neural network model identified in the request using the second training data set, e.g. using training system 200 (608). Once the re-training is complete (e.g., after the entire second training data set has been used to backpropagate new weights, or after the neural network model has been trained to a sufficient level of accuracy using the second training data set), the updated neural network weights may be provided to the camera device for use in inference (610).

In certain embodiments, an updated neural network model may be provided to camera devices 300 on a scheduled basis. For example, if a camera device 300 uses a neural network model that is trained to count children, and the monitoring area 404 contains lots of Trick-or-Treaters each Halloween, a specially trained neural network model trained to recognize children in costumes may be automatically provided to the camera device 300 to replace the ordinary local neural network model for the duration of Halloween.

Figure 7:
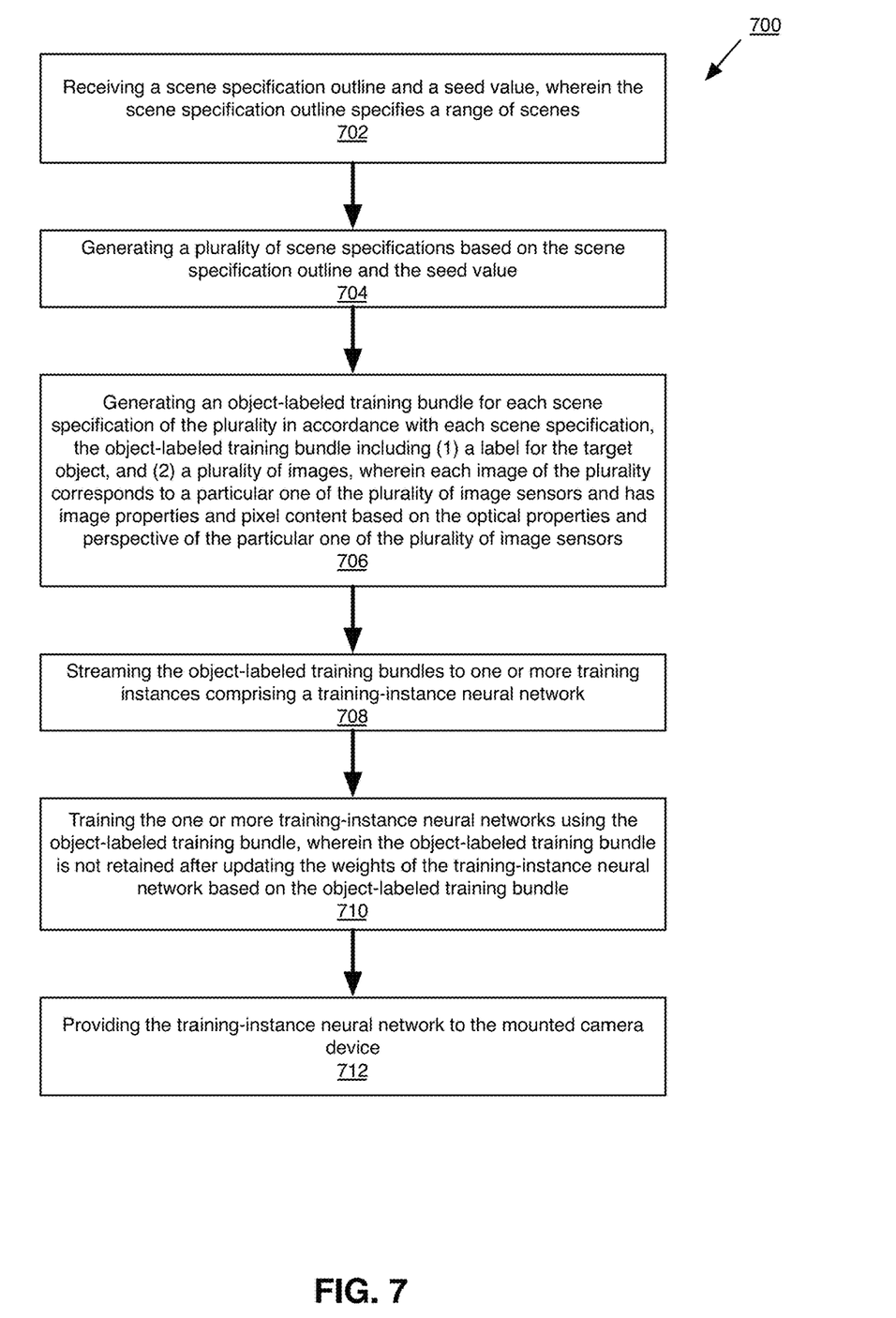
FIG. 7 is a flow chart for an exemplary process concerning generating training data and training a neural network model, in accordance with some embodiments of the invention.

FIG. 7 is a flow chart for an exemplary process 700 concerning generating training data and training a neural network model to identify targeted content. First, a component of a system such as training system 200 may receive a scene specification outline and a seed value, wherein the scene specification outline specifies a range of scenes (702). Each scene may comprise one or more objects and a camera model. A plurality of scene specifications may be generated based on the scene specification outline, using the seed value, in which the set of scene specifications generated based on a given scene specification outline and a given seed value will deterministically cause generation of the same set of scene specifications (704). The scene specifications should be prepared to include at least some examples of the targeted content as represented by objects that are target objects; additionally, the scene specifications may include objects that are prop objects. An object-labeled training bundle may be generated in accordance with each scene specification of the plurality of scene specifications, each bundle having (1) a label concerning the one or more target objects that may be represented in the scene specification (e.g., a label indicating that the target object is present at a location in the scene, or a label indicating that the target object is not present in the scene) and (2) a plurality of images, where each of the plurality of images in a bundle corresponds to a particular image sensor of a mounted camera device (e.g., a particular image may have the same resolution and perspective as a particular image sensor) (706). The generated object-labeled training bundles may be streamed to one or more training instances, each training instance comprising a training-instance neural network (708). The training-instance neural networks may be trained using the received object-labeled training bundles, so that the neural networks improve the ability to map the labels of the object-labeled training bundles to the images of the object-labeled training bundles (710). The object-labeled training bundles are not retained after they are used to backpropagate weights in the training-instance neural networks. Upon completion of training using the object-labeled training bundles, the training-instance neural networks are provided to a corresponding camera device 300 in a monitoring area 404 (712).

Figure 8:
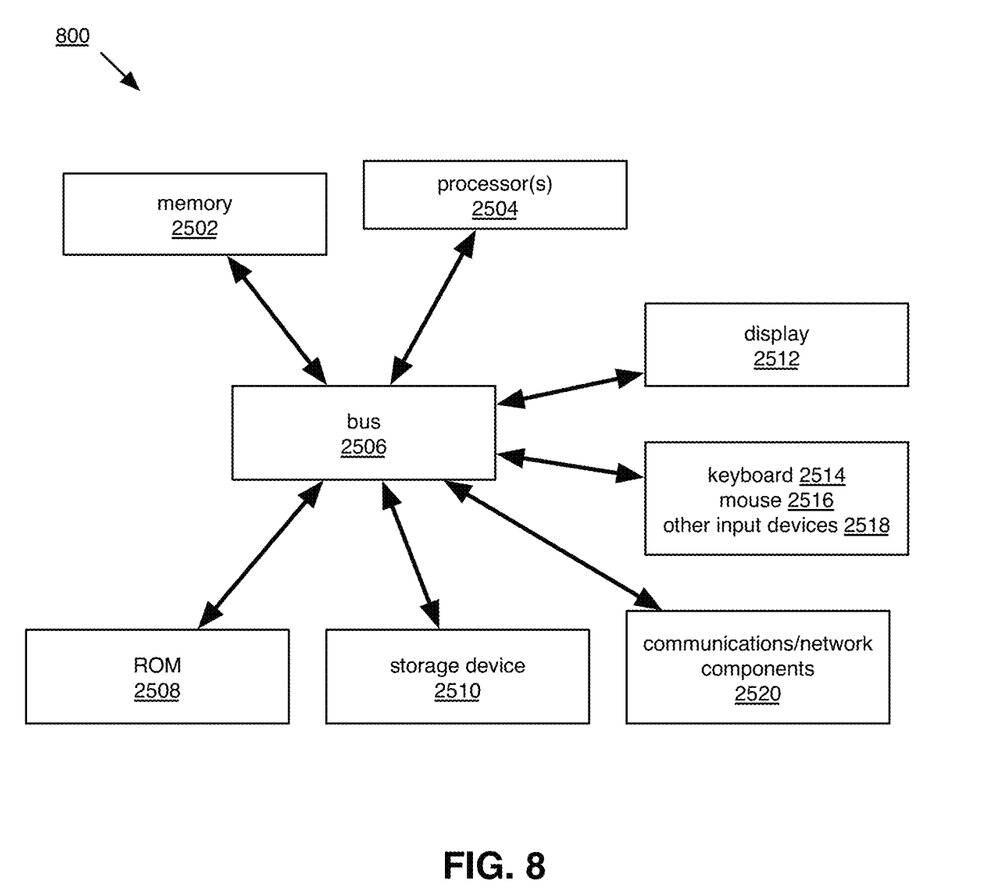
FIG. 8 shows a block diagram of an exemplary computing system, in accordance with some embodiments of the invention.

FIG. 8 shows a block diagram of an exemplary computing system, in accordance with some embodiments of the invention.

FIG. 8 is a block diagram showing an exemplary computing system 800 that is representative any of the computer systems or electronic devices discussed herein. Note that not all of the various computer systems have all of the features of system 800. For example, systems may not include a display inasmuch as the display function may be provided by a client computer communicatively coupled to the computer system or a display function may be unnecessary.

System 800 includes a bus 2506 or other communication mechanism for communicating information, and one or more processors 2504 coupled with the bus 2506 for processing information. Computer system 800 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 800 may include a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 800 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for training a neural network to identify targeted content, wherein the neural network is associated with a mounted camera device having a plurality of image sensors, comprising:
   receiving a scene specification outline and a seed value, wherein the scene specification outline specifies a range of scenes, and wherein each of the scenes comprises one or more objects and a camera model;
   generating a plurality of scene specifications based on the scene specification outline and the seed value, wherein certain of the plurality of scene specifications represent the targeted content as one or more target objects;
   generating an object-labeled training bundle for each scene specification of the plurality of scene specifications in accordance with each scene specification, the object-labeled training bundle including (1) a label concerning the one or more target objects, and (2) a plurality of images, wherein each image of the plurality of images corresponds to a particular one of the plurality of image sensors and has image properties and pixel content based on optical properties and a perspective of the particular one of the plurality of image sensors;
   streaming the object-labeled training bundles to one or more training instances comprising a training-instance neural network;
   training the one or more training-instance neural networks using the object-labeled training bundles, wherein each of the object-labeled training bundles is not retained after updating weights of the training-instance neural network based on the object-labeled training bundles;
   providing the training-instance neural network to the mounted camera device;
   receiving a request for retraining, wherein the request identifies a checkpoint of a training-instance neural network and an instruction regarding retraining; and
   modifying the scene specification outline to incorporate the instruction regarding retraining,
   wherein the checkpoint of the training-instance neural network is updated using weights associated with the identified checkpoint prior to training the training instance neural network.

2. The method of claim 1, wherein the camera model identifies a perspective and optical properties of the mounted camera device.

3. The method of claim 1, wherein the scene specification outline further specifies one or more prop objects.

4. The method of claim 1, wherein the step of generating a plurality of scene specifications includes generating particular combinations of object parameters from a plurality of distributions of object parameters based on the seed value.

5. The method of claim 1, wherein the step of generating an object-labeled training bundle for each scene specification of the plurality of scene specifications is performed in parallel by a plurality of renderers.

6. The method of claim 1, wherein for each of the one or more target objects, each respective bundle of a subset of the object-labeled training bundles contains a respective representation of the target object in certain pixels of each of the plurality of images of the respective bundle.

7. The method of claim 6, wherein for each of the object-labeled training bundles, the object-labeled training bundle includes a mapping between the pixels of the respective representations of the target object in the plurality of images, and the label for the target object.

8. The method of claim 1, wherein the instruction regarding retraining defines one or more prop objects to add to or remove from the scene specification outline.

9. The method of claim 1, wherein the instruction regarding retraining specifies a lighting condition.

10. The method of claim 1, wherein the instruction regarding retraining specifies a desired number of the object-labeled training bundles.

11. The method of claim 1, wherein the request for retraining was initiated by detection of an anomalous condition by the mounted camera device.

* * * * *